(12) United States Patent
Scopelitis

(10) Patent No.: US 10,143,188 B2
(45) Date of Patent: Dec. 4, 2018

(54) BAIT RETAINING DEVICE

(71) Applicant: Edward G. Scopelitis, Mount Pleasant, SC (US)

(72) Inventor: Edward G. Scopelitis, Mount Pleasant, SC (US)

(*) Notice: Subject to any disclaimer, the term of this patent is extended or adjusted under 35 U.S.C. 154(b) by 558 days.

(21) Appl. No.: 14/522,942

(22) Filed: Oct. 24, 2014

(65) Prior Publication Data

US 2016/0113254 A1 Apr. 28, 2016

(51) Int. Cl.
*A01K 83/06* (2006.01)

(52) U.S. Cl.
CPC .................... *A01K 83/06* (2013.01)

(58) Field of Classification Search
CPC ........ A01K 97/10; A01K 83/06; A01K 85/00; A01K 97/02
USPC .......................................................... 43/44.6
See application file for complete search history.

(56) References Cited

U.S. PATENT DOCUMENTS

| | | | | |
|---|---|---|---|---|
| 1,902,217 A * | 3/1933 | Catarau | ........... | A01K 83/06 43/44.2 |
| 2,848,836 A * | 8/1958 | Dodd | ........... | A01K 83/06 43/44.6 |
| 2,895,254 A * | 7/1959 | Krauss | ........... | A01K 83/06 43/44.6 |
| 2,927,393 A | 3/1960 | Flamisch et al. | | |
| 2,940,208 A * | 6/1960 | Oswald | ........... | A01K 83/04 43/42.09 |
| 3,200,532 A * | 8/1965 | Walton | ........... | A01K 83/06 43/44.6 |
| 3,289,346 A * | 12/1966 | Ehling | ........... | A01K 83/06 43/44.6 |
| 3,543,434 A * | 12/1970 | Hauck | ........... | A01K 83/06 43/44.6 |
| 3,945,145 A * | 3/1976 | Holden | ........... | A01K 83/06 43/44.6 |
| 4,221,069 A * | 9/1980 | Esses | ........... | A01K 83/06 43/41 |
| 4,233,771 A * | 11/1980 | Robinson | ........... | A01K 83/06 43/41 |
| 5,611,168 A | 3/1997 | Schultz | | |
| 5,829,186 A | 11/1998 | Schultz | | |
| 6,050,023 A | 4/2000 | Newell | | |
| 6,061,948 A * | 5/2000 | Boucek | ........... | A01K 85/00 43/42.09 |

(Continued)

*Primary Examiner* — Shin H Kim
(74) *Attorney, Agent, or Firm* — Southeast IP Group, LLC.; Thomas L. Moses; Randolph J. Tucker

(57) ABSTRACT

A bait retaining device removably attachable to fishing bait includes a strip of material rigid enough to remain in an operative position but malleable enough to be disengaged by pulling. The strip is generally U-shaped, having legs joined by a base segment. Teeth to hold bait protrude from the side of each leg facing the other. The base segment of the U-shaped strip defines a hole through which the shaft of an anchor pin is inserted. The anchor pin is secured through the hole on one distal end by a head that cannot pass through the hole and allows the U-shaped strip to rotate freely. The other distal end of the anchor includes a loop for connection to the eyelet of a hook. A support piece, made of dense or buoyant material, is located between the legs and adjacent the base segment and may be removable and interchangeable.

10 Claims, 4 Drawing Sheets

(56) References Cited

U.S. PATENT DOCUMENTS

| | | | |
|---|---|---|---|
| 6,658,785 B1 * | 12/2003 | Faulkner | A01K 83/06 43/42.36 |
| 6,895,710 B2 | 5/2005 | Hanson | |
| 7,174,669 B1 * | 2/2007 | Kallas | A01K 85/01 43/42.06 |
| 7,841,127 B1 | 11/2010 | Nakamichi | |
| 7,980,021 B2 | 7/2011 | Siatkowski | |
| 2005/0044772 A1 | 3/2005 | Lillars, II | |
| 2011/0214334 A1 | 9/2011 | Demarais | |
| 2016/0113254 A1 * | 4/2016 | Scopelitis | A01K 83/06 43/44.6 |

* cited by examiner

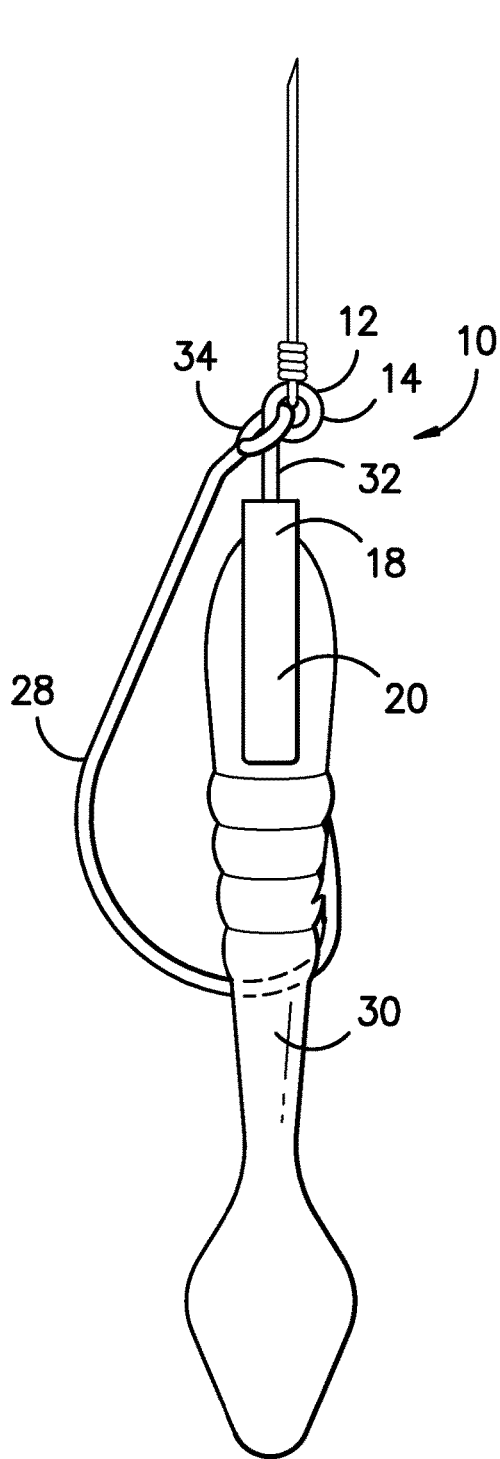
FIG. -1-
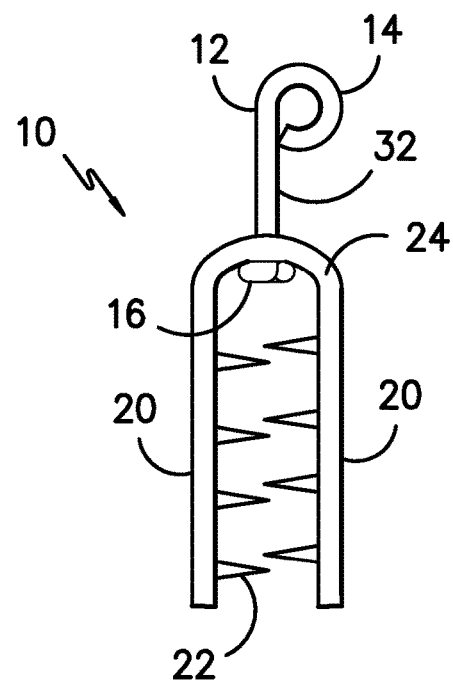
FIG. -2-
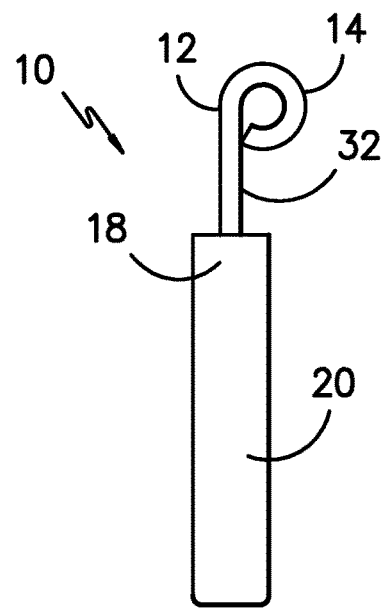
FIG. -3-

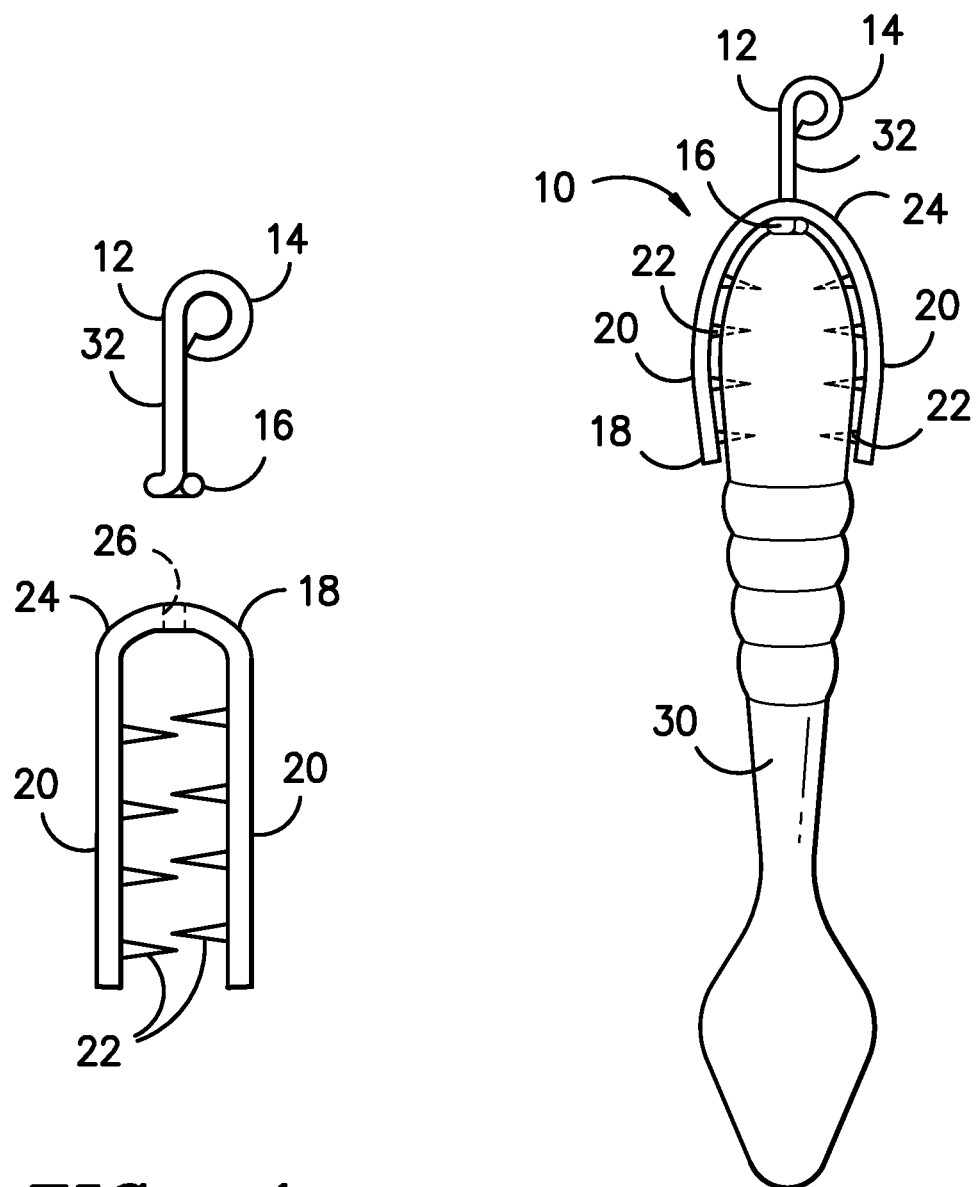
FIG. -4-
FIG. -5-

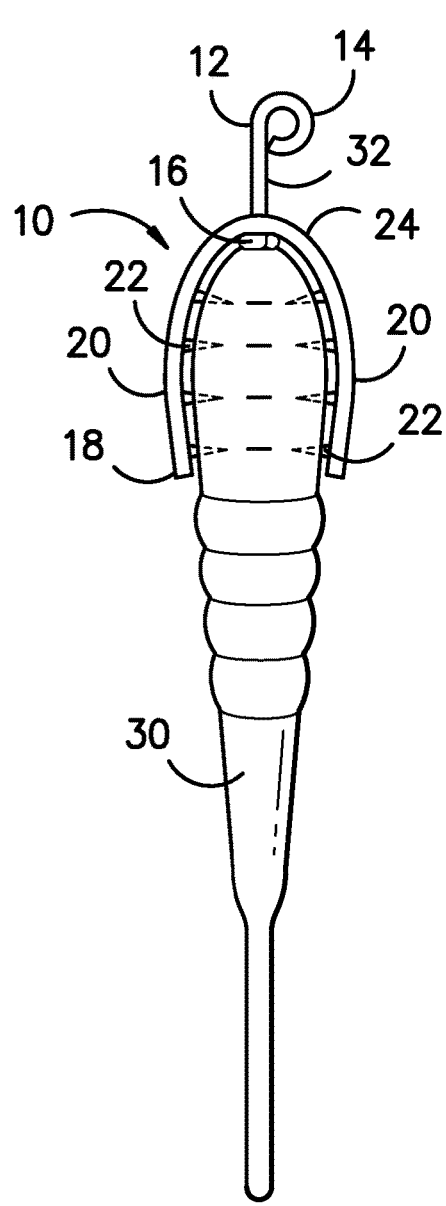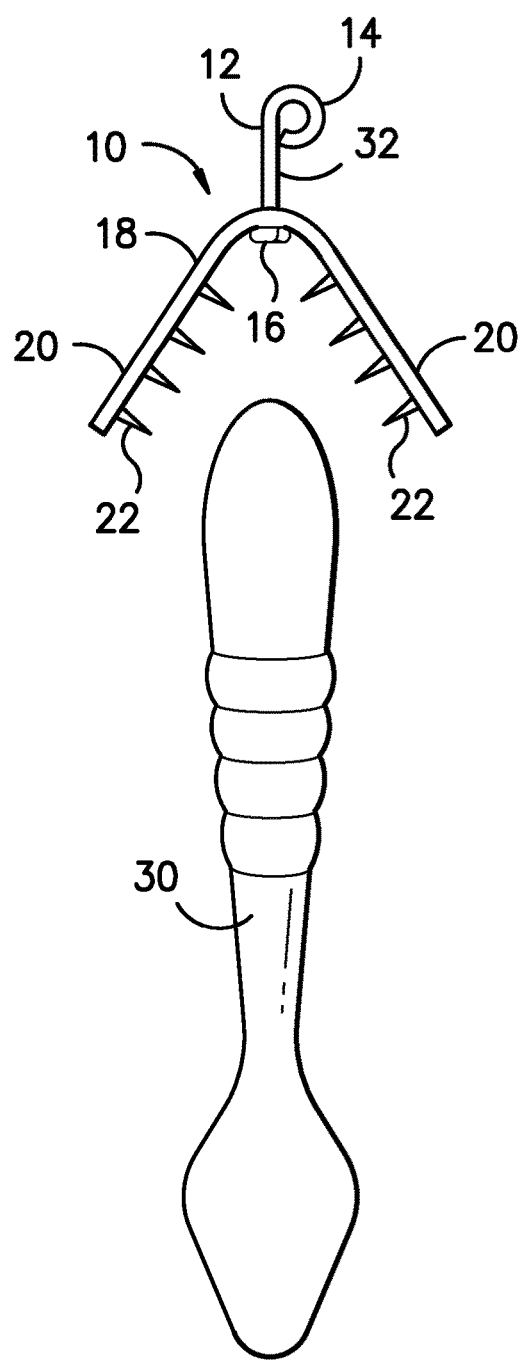
FIG. -6-
FIG. -7-

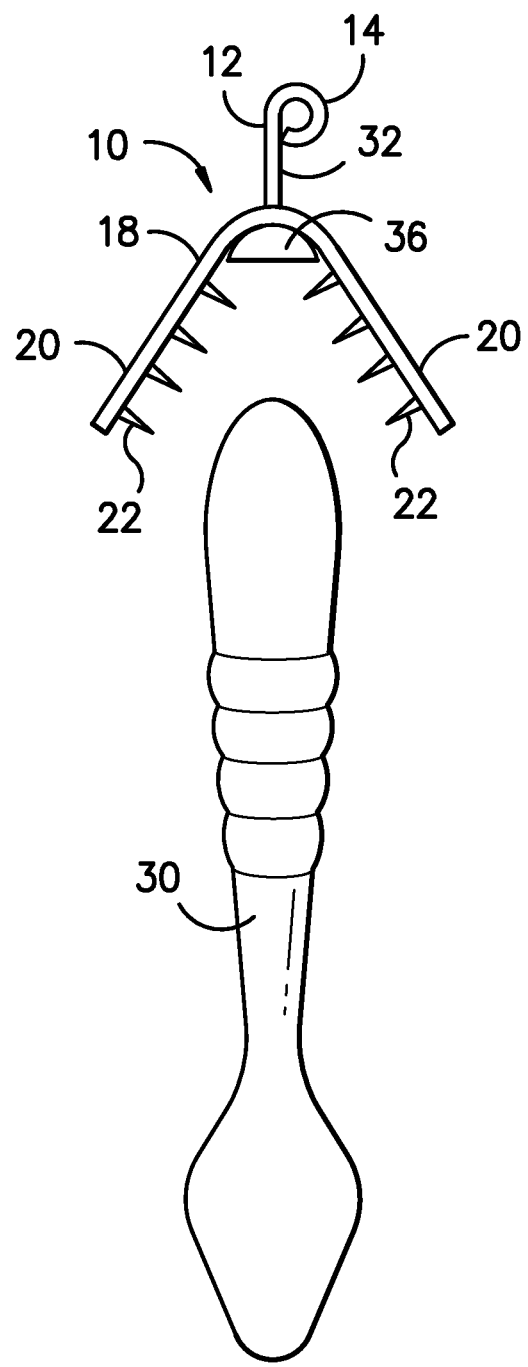
FIG. -8-

BAIT RETAINING DEVICE

BACKGROUND OF THE INVENTION

The present invention relates generally to fishing lures, and more particularly to a device for preventing bait, also referred to herein as lures, from slipping down the shank of a fishhook. More specifically, the present invention is directed to a novel bait retaining device, wherein the device secures bait in a simple and effective way and allows for disengagement and reattachment upon a new portion of the bait providing a dramatic improvement in the life of the bait.

The use of bait in fishing is ancient. The use of artificial worms and live bait is particularly common. Many different types of devices have been developed and used to secure bait to hooks and extend the useful life of bait. However, most devices and methods gave little support to lures and, once used, would render the lure useless in other applications or even repeated use because of the likelihood of ripping and tearing the lure.

Examples of devices designed to hold bait and lures include the following: U.S. Pat. No. 5,611,168 discloses a deep sea fishing lure with teeth and body closure which consists of upper and lower cylindrical jaws pivotally connected and biased together with a spring. The inside of the jaws have rows of teeth, designed to hold live bait. The design is such that it is to prevent water from washing out the live bait.

U.S. Pat. No. 6,050,023 discloses a bait holding device designed to simulate a bait predator. It is comprised of a pair of complementary clasps which are designed to hold bait without impaling the bait. The clasps have a handle portion and a hinge which are designed so a hook may be inserted and secured. The non-impaling feature of this device is to preserve to life of live bait.

U.S. patent application Ser. No. 10/604,937 is directed to a fish hook with a bait attachment clip. The bait attachment clip is coupled to the hook and a flexible sleeve is slid onto the hook to removably couple the bait attachment clip in an operative position. The combination is designed to enable live or artificial bait to be more readily coupled to the hook in a secured manner. The bait is not impaled by the clip. The clip has jaws which are pivotally connected and biased together with a spring, whereby a user can compress the jaw ends together to open the opposing jaw ends out of the clamping position.

U.S. patent application Ser. No. 13/038,829 is directed to a device attachable to an artificial fishing lure to prevent an artificial trailer bait from sliding down the lure's fish hook. It is comprised of a piece of wire that is formed generally into a U-shape consisting of a pair of legs joined by a base segment where the end of each leg is turned inward towards the opposing leg. Each terminal portion is adapted to penetrate into and hold artificial bait in place on the hook.

U.S. Pat. No. 7,841,127 discloses a fishing hook rig where a connector is formed with a spiral wire surrounding a portion of a straight wire pin and the connector is fixed to the top end of a fishing hook. An artificial bait is connected to the straight and spiral wire combination in order to secure it from sliding down a hook and to form, once the hook is entered into a lower portion of the artificial bait, a snag resistant rig for fishing.

Several problems exist with these prior art lures and bait holders. For example, the prior art devices that do not impale bait, do not sufficiently hold bait to prevent loss of it. Many of these devices are also complicated multi-piece constructions which makes them difficult to assemble and expensive to manufacture. The prior art devices that do impale rip and tear the bait at the connection points and fail to extend the life of the artificial bait. Therefore, there is a need among bait retaining devices for a device that sufficiently secures bait by impaling and will extend the useful life of the bait.

BRIEF SUMMARY OF THE INVENTION

In accordance with one aspect of the invention, a bait retaining device may include a U-shaped strip with teeth for securing a bait to a hook generally about the end of the bait. The bait may be artificial or live. Live bait may include worms and shrimp. The U-shaped strip may have two legs and a base member joining the legs. The legs have impaling teeth affixed to the side of each leg facing the other leg. The base member may define a hole to facilitate securing the U-shaped strip to an anchor pin.

The bait retaining device may include an anchor pin with a loop at one end, for connection to an eyelet of a hook, and a means for securing a U-shaped strip so that the U-shaped member may rotate freely about the anchor pin as the rotation axis, at the opposite end. The means for securing the U-shaped strip, in one embodiment, may be a hole defined by the U-shaped strip generally about the center through which the anchor pin may be inserted, the anchor pin terminating at the distal end from the hook including a head bigger than the hole inserted there through. The head prevents the removal of the anchor pin from the hole defined by the U-shaped strip. The shape may allow for the free-rotation of the U-shaped strip. The bait retaining device may further feature a support piece to assist the U-shaped strip in retaining its shape. The support piece may be disposed adjacent to the base member and in between the legs of the U-shaped strip. The support piece may further define a hole about the center through which the anchor pin may be inserted, the anchor pin terminating at the distal end from the hook including a head bigger than the hole, defined by the support piece, inserted there through. The support piece may further be removable and interchangeable with other support pieces to provide for different characteristics, such as increased or decreased buoyancy. In use, a fisherman may select a support piece that is buoyant, if he wishes to fish topwater or in shallow water, and alternately, may select a support piece that is dense and tends to sink, for bottom fishing or fishing in deeper water.

The U-shaped strip and impaling teeth may be made of a material that is rigid but malleable enough that it may be formed and manipulated so as to close on bait and secure it and be opened for removal or readjustment of the bait. The anchor pin may be made of the same material or a material with less flexibility and more rigidity to prevent disengagement of the connection with the hook or the U-shaped strip. The support piece may be made of materials such as plastic, lead, or any other suitable material to increase or decrease the buoyancy of the bait retaining device as desired.

It is an object of this invention to reduce the snagging potential of the combination by rigging live bait, like shrimp, and artificial bait in a weedless manner.

Another object of the invention is to form a snag-resistant combination that will easily set in a fish mouth.

Another object of the invention is to reduce the complexity and cost of forming such a snag-resistant combination by forming securing means for an upper end of bait by way of a U-shaped strip of material having impaling teeth to grip the bait.

Another object is to dramatically improve the securing means of bait by having multiple impaling teeth grip along multiple points on the bait.

Another object is to dramatically improve the life of bait by using multiple impaling teeth to grip multiple points on the bait, thereby distributing the forces which would typically widen the holes created by the impaling members.

Another object is to increase the effective life of bait by having a U-shaped member that can be connected and unconnected for realignment of the bait to positions without rips, tears, wear, or widened holes.

BRIEF DESCRIPTION OF THE DRAWINGS

These and other features, aspects, and advantages of the present invention will become better understood with regard to the following description, appended claims, and accompanying drawings where:

FIG. 1 is a side view of one embodiment of the bait retaining device with a hook further connected to the device and the bait in the secured position;

FIG. 2 is a top view of one embodiment of the anchor pin inserted through a hole in the base member of the U-shaped strip facilitating free rotation while securing connection of the anchor pin and U-shaped strip;

FIG. 3 is a side view of one embodiment of the anchor pin inserted through a hole defined by the base member of the U-shaped strip with a loop at a distal end of the anchor pin;

FIG. 4 is a top exploded view of one embodiment of the bait retaining device, without lure, separately showing the anchor pin with the loop at one end and securing means at the other; separately showing a U-shaped strip featuring the teeth on the inside and having broken lines representing the hole defined by the U-shaped strip;

FIG. 5 is a top view of one embodiment of the bait retaining device connected to a lure;

FIG. 6 is a top view of one embodiment of the bait retaining device after the U-shaped strip and teeth have been unattached, the lure rotated and the teeth and U-shaped strip re-attached upon a new position on the lure. The dashes upon the lure represent the prior attachment points;

FIG. 7 is a top view of one embodiment of the bait retaining device unconnected from the bait, but showing the bait positioned as ready to connect with the device; and FIG. 8 is a top view of one embodiment of the bait retaining device unconnected from the bait, but showing the bait positioned as ready to connect with the device. The U-shaped strip further features a support piece.

DETAILED DESCRIPTION OF THE INVENTION

The present invention is a bait retaining device 10 having a simple and novel means for securing bait 30 to a hook 28. In one embodiment shown in FIG. 6, the device 10 includes an anchor pin 12 and a U-shaped strip 18 connected by having the shaft of the anchor pin 32 inserted through a hole 26 defined by the U-shaped strip 18, where the U-shaped strip 18 can rotate freely about a rotation axis of the anchor pin 12. The anchor pin 12 passes through a hole 26 defined by the U-shaped strip and terminates between the legs 20 of the U-shaped strip 18 having a head 16 which has a circumference larger than that of the hole 26 and is connected to the shaft of the anchor pin 32 so that the anchor pin 12 cannot be removed from the hole 26. The length of the anchor pin may vary, as desired. The head 16 may be a flat disc, sphere, square, cylinder, cuboid, cone, or other desired useful shape. The head 16 may also be a bend or twist of the shaft of the anchor pin 32 sufficient to prevent the anchor pin 12 from being removed from the hole 26. As shown in FIG. 1, the anchor pin 12 may terminate on the opposite end from the head 16 with a loop 14. The loop 14 may connect to the eyelet of a hook 34 or fishing line. Further, it is anticipated that the anchor pin 12 may be connected to the U-shaped strip 18 by other suitable means to provide for rotation of the U-shaped strip 18. It is also anticipated that the anchor pin 12 may be connected to the U-shaped strip 18 by fixed means that do not provide for the rotation of the U-shaped strip 18.

As shown in FIG. 2, the U-shaped strip 18 may have legs 20 and a base member 24 connecting the legs 20. The base member 24 may have a hole 26 defined by the base member 24 through which the shaft of the anchor pin 32 can pass, as shown in FIG. 4. It is anticipated that the base member may be manufactured to be thicker or of a reinforced construction and may optionally include a support piece 36 on an underside of the base member 24 in order to retain the U-shape of the base member 24 and U-shaped strip 18 during use, as shown in FIG. 8. The support piece 36 may further define a hole about the center through which the anchor pin 12 may be inserted, the anchor pin 12 inserted there through and terminating at the distal end from the hook 28, including a head 16 bigger than the hole, defined by the support piece 36. The support piece 36 may be made from different types of material, in order to provide different characteristics. For instance, the support piece may be made from a dense metal, such as lead, to provide weight for bottom fishing or deepwater fishing, or alternatively, the support piece 36 may be made from a buoyant plastic or other material, in order to provide buoyancy to the bait retaining device for topwater or shallow water fishing. The support piece 36 may further be removable and interchangeable with other support pieces to provide for increased or decreased buoyancy. The legs 20 preferably feature impaling teeth 22 designed to secure bait 30 at one end and prevent it from sliding down the hook 28, and allowing the bait 30 to be connected to the hook 28 in a way that reduces snagging potential in a "weedless" configuration, as shown in FIG. 1. The impaling teeth 22 are preferably located on the sides of the legs 20 facing one another. The number of impaling teeth 22 may be variable but generally more teeth will make the connection more secure. Also, more impaling teeth 22 generally increases the life of bait 30 by dispersing frictional forces over multiple impaling teeth 22 inserted into bait 30. As a result, the force for each of the impaling teeth 22 pulling at the impaled points in the bait 30 is reduced and the effectiveness and longevity of the secure connection is increased.

As shown in FIG. 7, the U-shaped strip 18 may be disengaged to readjust the bait 30 so that a more secure connection may be made to the bait. The more secure connection points are the sides of the lure that are less affected by wear, tear, shear, or widening of holes created by the impaling teeth 22. The bait may be readjusted by rotating the bait about an axis that runs the length of the bait, as shown in FIG. 6. The bait may also be readjusted by altering the distance of the bait in relation to the base member 24 (pushing the bait further in or pulling the bait further out of the U-shaped strip 18). Alternatively, disengagement may also allow for a new lure 30 to be connected with the U-shaped strip 18, if needed.

In an operative position shown in FIG. 5, the U-shaped strip 18 and legs 20 may make contact with the bait 30, securing it at a front end. The U-shaped strip 18, however, may be released or releasable from the operative position by pulling the legs 20 outward from one another to disengage the impaling teeth 22 from the bait 30 as shown in FIG. 7.

It is contemplated that the material the U-shaped strip 18 is composed of may be rigid enough to hold the lure 30 and stay formed in operative position while also being malleable enough to be disengaged from said operative position by pulling the legs 20 away from each other. In one embodiment, the U-shaped strip 18 is composed of material having the malleability and rigidity characteristics of lead. It is also contemplated that the material that the anchor pin 12 may be made of the same material or a material more with more rigid characteristics and less malleability than lead to prevent disengagement of the connection between the shaft of the anchor pin 32 and the base member 24 of the U-shaped strip 18. The support piece 36 and any interchangeable replacements may be made of different materials such as plastic, lead, or any other suitable material to, for example, increase or decrease the buoyancy of the bait retaining device 10 as desired. The bait retaining device 10 may be made from metals, such as lead or aluminum, plastics, or any other suitable material. The individual parts of the bait retaining device 10 may also be made of different materials to effect further desired characteristics.

The described bait retaining device 10 has many advantages. Advantages highlighted earlier include the increased effective life of the bait. Some other advantages include an increased ease of use and adjustment allowing for more life-like/natural bait movement and increased distance and accuracy in casting. It is anticipated that certain characteristics of the bait retaining device 10 may be alterable to enhance these and other advantages as necessary. For example, the bait retaining device 10 may be painted or designed to have eyes or other desired characteristics of the lure 30 it is securing to mimic those types of lures and create a more life-like perception. Additionally, the length of the shaft of the anchor pin 32 may be varied to accommodate various types of lures. Further, the bait retaining device 10 may be made of different materials to alter the weight of the device 10 and allow for desired accuracy and distance in casting. Also, the legs 20 of the U-shaped strip 18 may also be different weights to alter the bait movement through the water.

Although the present invention has been described in considerable detail with reference to certain preferred versions thereof, other versions are possible. Therefore, the spirit and scope of the appended claims should not be limited to the description of the preferred versions contained herein. All features disclosed in this specification may be replaced by alternative features serving the same, equivalent or similar purpose, unless expressly stated otherwise. Thus, unless expressly stated otherwise, each feature disclosed is one example only of a generic series of equivalent or similar features.

What is claimed is:

1. A bait retaining device comprising:
   a generally U-shaped strip having two generally straight legs and a base member connecting said legs forming a generally U-shape;
   series of teeth protruding from said legs on an inner portion of said legs facing the other leg, said teeth protruding generally perpendicularly from said legs for penetrating the bait; and
   means for operatively connecting the base member to a fishing hook;
   wherein said base member defines a hole for receiving a retaining pin.

2. The bait retaining device set forth in claim 1, wherein said means for operatively connecting the base member to a fishing hook is an anchor pin connected to a loop positioned at a top of said fishing hook and where said anchor pin terminates at an end opposite said fishing hook with a connection to said base member.

3. The bait retaining device set forth in claim 1, wherein said means for operatively connecting said base member to a fishing hook is an anchor pin with a loop secured to an eyelet of said fishing hook, a shaft of said anchor pin extending through said hole in said base member, for securement thereto.

4. The bait retaining device set forth in claim 1, wherein said means for connecting said base member to a fishing hook allows for the free rotation of said U-shaped strip.

5. The bait retaining device set forth in claim 1, wherein said means for connecting said base member to a fishing hook comprises an anchor pin, adapted to be connected to a hook, which extends through a hole defined by the base member and is secured therein by a head member disposed at the distal end of said anchor pin wherein said head member cannot pass through said hole.

6. The bait retaining device set forth in claim 1, further featuring a support piece disposed adjacent to said base member and in between said legs.

7. The bait retaining device set forth in claim 1, further featuring a support piece disposed adjacent to said base member and in between said legs.

8. The bait retaining device set forth in claim 6, wherein said support piece is made from a buoyant material.

9. The bait retaining device set forth in claim 6, wherein said support piece is made from a dense non-buoyant material.

10. The bait retaining device set forth in claim 6, wherein said support piece is removably attached to said bait retaining device, and is interchangeable with other support pieces.

* * * * *